United States Patent [19]
Nagata et al.

[11] Patent Number: 6,109,646
[45] Date of Patent: *Aug. 29, 2000

[54] STEERING WHEEL

[75] Inventors: Norinari Nagata, Aichi-ken; Atsushi Nagata, Inazawa; Katsunobu Sakane, Ichinomiya; Akio Hosoi, Komaki; Ichizou Shiga, Aichi-ken, all of Japan

[73] Assignee: Toyoda Gosei Co., Ltd., Nishikasugai-gun, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/023,075

[22] Filed: Feb. 13, 1998

[30] Foreign Application Priority Data

Feb. 13, 1997 [JP] Japan ................................ 9-029145
Mar. 10, 1997 [JP] Japan ................................ 9-054919

[51] Int. Cl.⁷ .................................................. B60R 21/16
[52] U.S. Cl. ...................... 280/731; 280/728.2; 200/61.54
[58] Field of Search .............................. 280/731, 728.2; 200/61.54, 61.55, 86 R

[56] References Cited

U.S. PATENT DOCUMENTS

| | | | |
|---|---|---|---|
| 5,615,910 | 4/1997 | Margetak et al. | 280/731 |
| 5,647,610 | 7/1997 | Nagata | 280/731 |
| 5,676,396 | 10/1997 | Fohl | 280/731 |
| 5,685,557 | 11/1997 | Persson et al. | 280/728.2 |
| 5,720,494 | 2/1998 | Hosoi et al. | 280/731 |
| 5,738,370 | 4/1998 | Hosoi et al. | 280/731 |
| 5,775,728 | 7/1998 | Niwa et al. | 280/728.3 |
| 5,794,968 | 8/1998 | Yamamoto et al. | 280/728.2 |
| 5,806,377 | 9/1998 | Noda et al. | 74/552 |
| 5,873,596 | 2/1999 | Kantoh et al. | 280/728.2 |
| 5,897,133 | 4/1999 | Papandreou | 280/728.2 |
| 5,904,366 | 5/1999 | Nishijima et al. | 280/728.2 |
| 5,906,389 | 5/1999 | Fischer | 280/728.2 |

*Primary Examiner*—Lanna Mai
*Assistant Examiner*—Lynda Jasmin
*Attorney, Agent, or Firm*—Pillsbury Madison & Sutro LLP

[57] ABSTRACT

A steering wheel includes an air bag device located centrally of a steering wheel. The air bag device includes an air bag, an inflator for supplying gas to the air bag to inflate the air bag, and a bag holder for holding the air bag and the inflator. Bolts, which are attached to the inflator, are inserted in bolt holes of the air bag and bolt holes of the bag holder. This couples the air bag, the inflator and the bag holder to each other. The bolts and nuts are used for securing the integrally joined air bag, inflator and bag holder to the steering wheel. As a result, the number of bolts and nuts need to secure the air bag device to the steering wheel is reduced.

11 Claims, 13 Drawing Sheets

STEERING WHEEL

BACKGROUND OF THE INVENTION

1. Field of the Invention

The present invention relates to a steering wheel of a vehicle, and more particularly, to a steering wheel having an air bag.

2. Background

A typical steering wheel includes an annular gripping ring and a pad. The pad is located at the center of the ring and is connected to the ring by spokes. A metal ring core is embedded in the gripping ring while a metal spoke core is embedded in the spokes. The ring core and the spoke core are covered by a surface layer formed from, for example, polyurethane foam. A boss plate is connected to the spoke core below the pad to connect the steering wheel to a steering shaft. The boss plate is fastened to the distal end of a steering shaft by a nut.

An air bag device is mounted on the steering wheel after the spoke core and the boss plate are secured to the steering shaft by the nut. The pad is then mounted over the air bag device.

Japanese Unexamined Patent Publication No. 3-169764 discloses such a steering wheel assembling method. The air bag device includes an inflator, an air bag, a ring retainer and a bag holder. The pad includes a bracket projecting downwardly. The inflator, the air bag, the ring retainer and the bag holder are secured to one another by bolts. The bag holder is then fastened to the bracket of the pad by bolts. The bag holder is further fastened to the spoke core by bolts.

In the method of this Japanese publication, the bolts are used for fastening the parts to one another. This complicates the mounting of the steering wheel and increases the number of parts.

SUMMARY OF THE INVENTION

Accordingly, it is an objective of the present invention to provide a steering wheel that reduces the number of parts and facilitates the mounting of the steering wheel.

To achieve the above objective, the present invention provides a steering wheel mounted on a steering shaft. The steering wheel includes a ring member serving as a hand grip, a boss member secured to the steering shaft, a spoke member for connecting the boss member to the ring member, and an air bag device located centrally of the steering wheel. The air bag device includes an air bag, an inflator for supplying gas to the air bag to inflate the air bag, and a bag holder for holding the air bag and the inflator. A fastener integrally joins the air bag, the inflator and the bag holder to each other. The fastener secures the integrally joined air bag, inflator and bag holder to the steering wheel.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE CURRENTLY PREFERRED EMBODIMENTS OF THE INVENTION

A first embodiment of a steering wheel according to the present invention will be described with reference to FIGS. 1 to 6.

Figure 1:
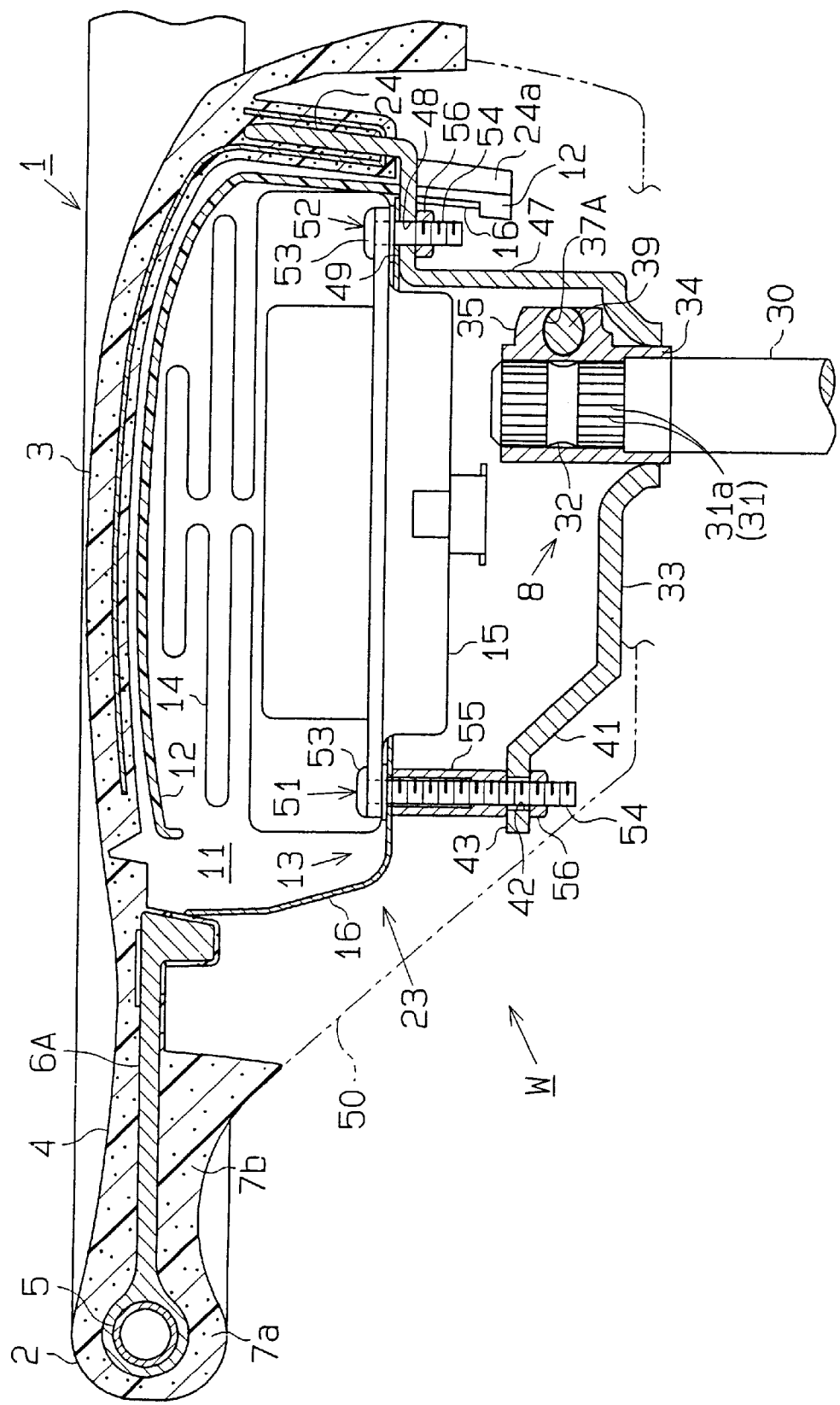
FIG. 1 is a partial cross-sectional view illustrating a steering wheel according to a first embodiment of the present invention and taken along line I—I of FIG. 3.
Figure 3:
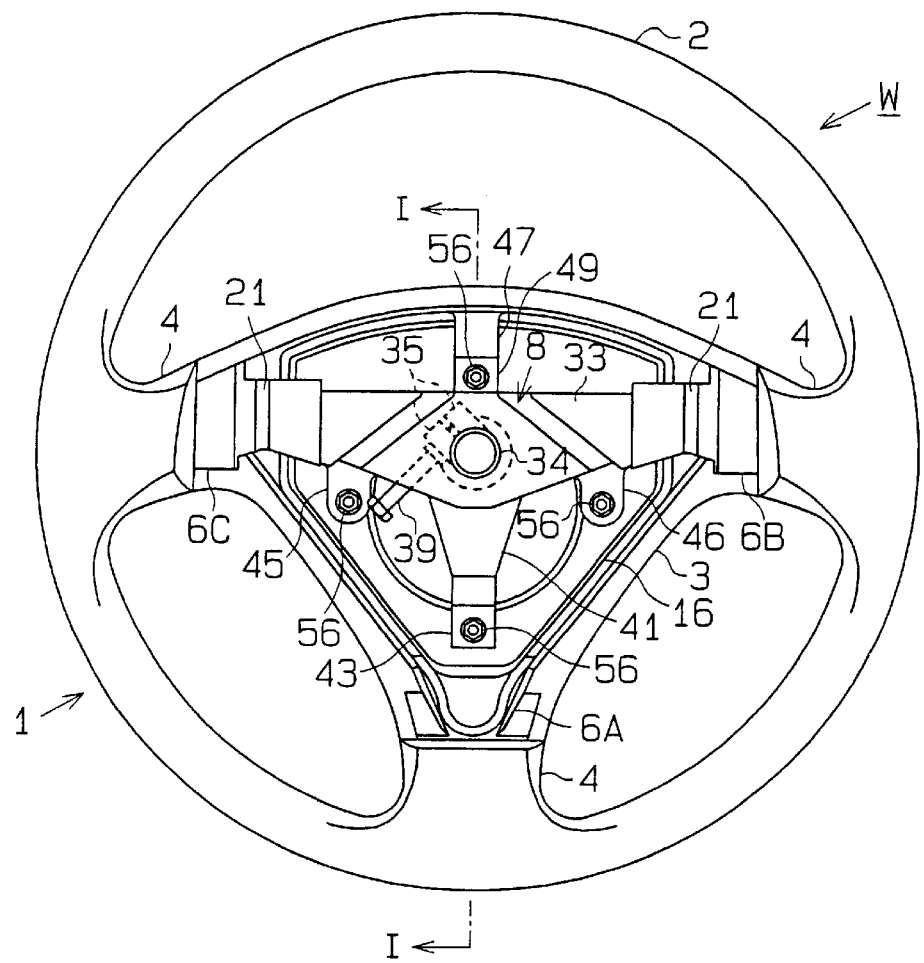
FIG. 3 is a rear view of the steering wheel of FIG. 1.

As shown in FIGS. 1 and 3, a body 1 of a steering wheel includes an annular gripping ring 2, a pad 3 arranged in the center of the ring 2, and three spokes 4 connecting the ring 2 with the pad 3. The ring 2 includes a metal ring core 5, which may be made of a steel pipe, and a surface layer 7a, which covers the ring core 5. The spokes 4 include metal spoke cores 6A, 6B, 6C, which are die cast from aluminum, and a surface layer 7b, which covers the spoke cores 6A, 6B, 6C. The surface layers 7a, 7b and the pad 3 are formed integrally from a soft synthetic resin such as polyurethane foam. The steering wheel body 1 is fastened to a boss 8. The fastening structure will be described later.

An accommodating space 11 is defined below the pad 3. The space 11 is surrounded by the surface layer 7b and accommodates a membrane switch (not shown), a resin switch plate 12 and an air bag device 13. The membrane switch is secured to the switch plate 12 and has a pair of thin plates that form part of a horn switch circuit (not shown). When the pad 3 is pressed, the thin plates contact each other and activate a horn.

The air bag device 13 includes an air bag 14, which is stored in a folded state, an inflator 15, which supplies gas to the air bag 14 for inflating the bag 14, and a bag holder 16, which securely holds the air bag 14 and the inflator 15.

Figure 2:
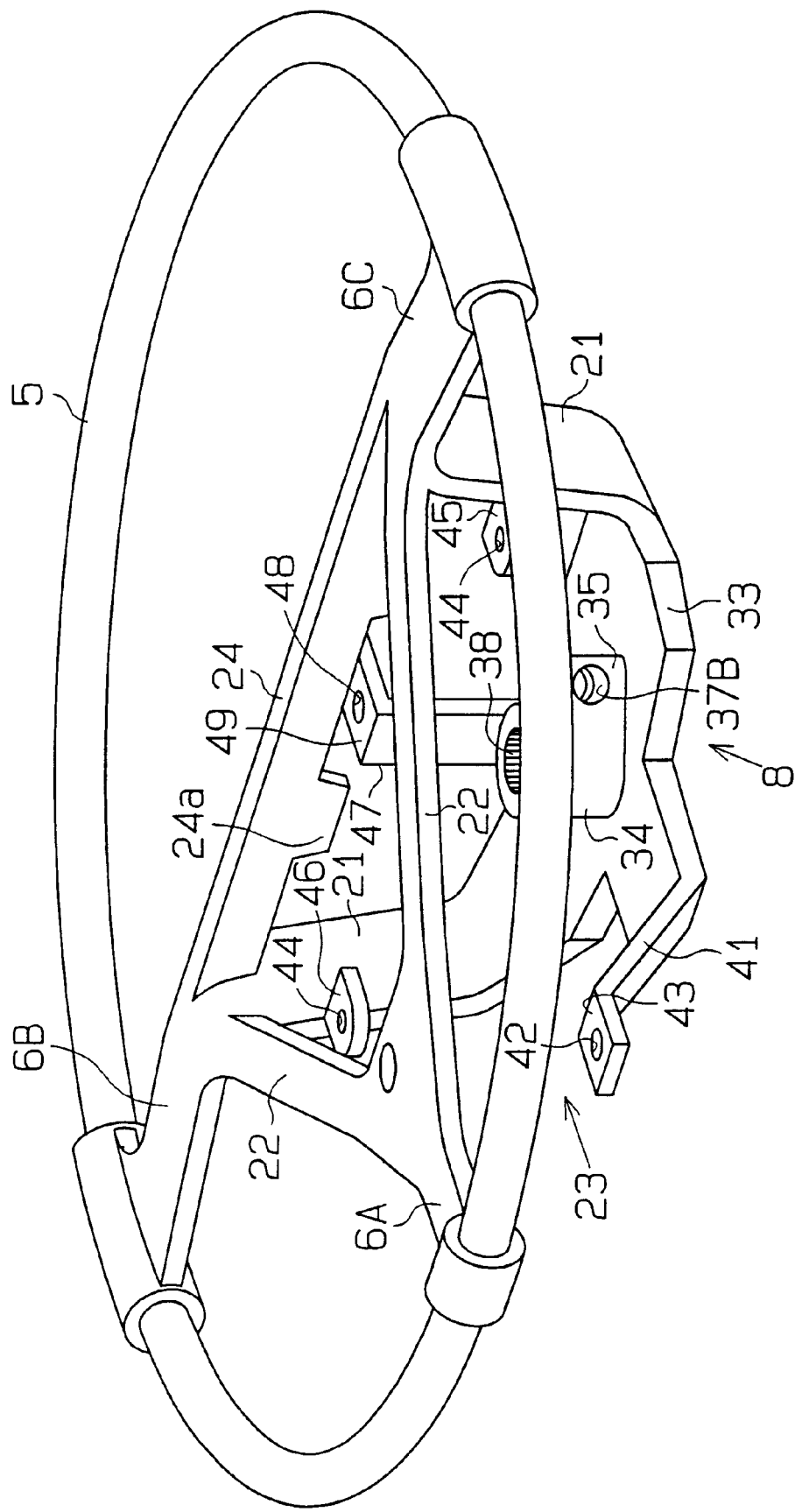
FIG. 2 is a perspective view illustrating cores of the steering wheel of FIG. 1.

The boss 8 is integrally coupled to the steering wheel body 1. More specifically, the boss 8 is integrally coupled to the spoke cores 6A, 6B, 6C. As shown in FIG. 2, the boss 8 is coupled to the left and right spoke cores 6B, 6C by arms 21. The boss 8 is located below the ring core 5 and the spoke cores 6B, 6C.

The spoke cores 6B, 6C are coupled to the other spoke core 6A (driver's side) by frames 22. The spoke cores 6A, 6B, 6C, the ring core 5 and the boss 8 are thus firmly coupled to each other by the arms 21 and the frames 22. The connecting structure of the boss 8, the arms 21 and the frames 22 provides a relatively large opening 23 in front of the driver's seat. The spoke cores 6B, 6C are coupled to each other by a support bar 24. The bar 24 stabilizes the wheel W during inflation of the bag 14. A bracket 24*a* is integrally formed with and protrudes downward from the bar 24.

The boss 8 is made of steel. Like the spoke cores 6A, 6B, 6C, the arms 21, the frames 22 and the bar 24 are die casted from aluminum. As illustrated by double-dotted lines in FIG. 1, the lower side of the steering wheel body 1 is covered by a resin cover 50, which surrounds the steering shaft 30.

The assembly of the steering wheel W will now be described.

Figure 4:
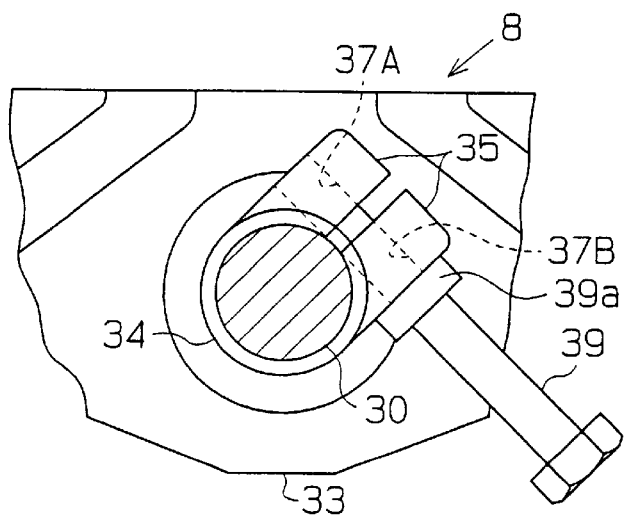
FIG. 4 is partial cross-sectional view illustrating a boss of the steering wheel of FIG. 1.
Figure 5:
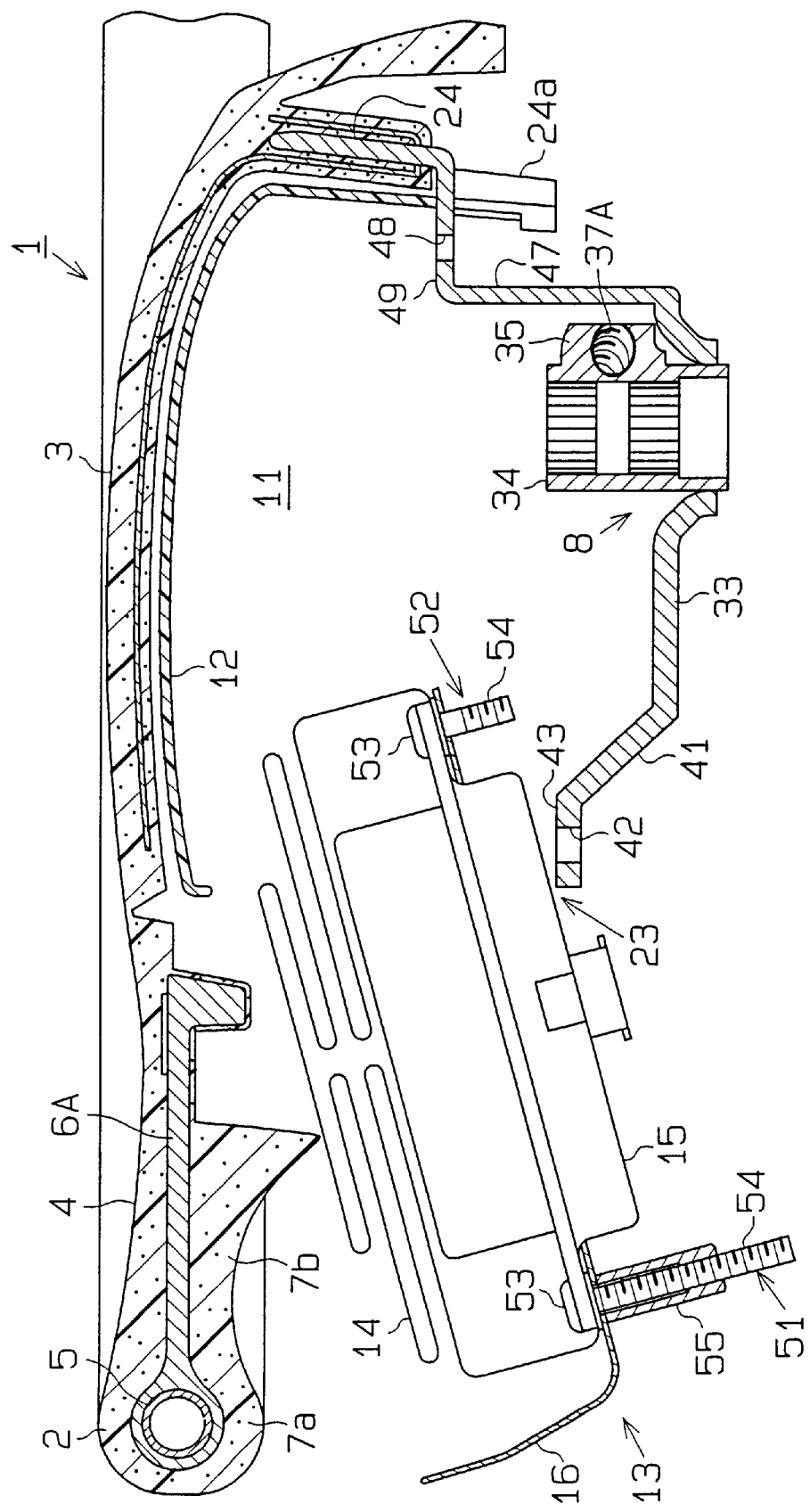
FIG. 5 is a partial cross-sectional view showing an air bag device being installed.
Figure 6:
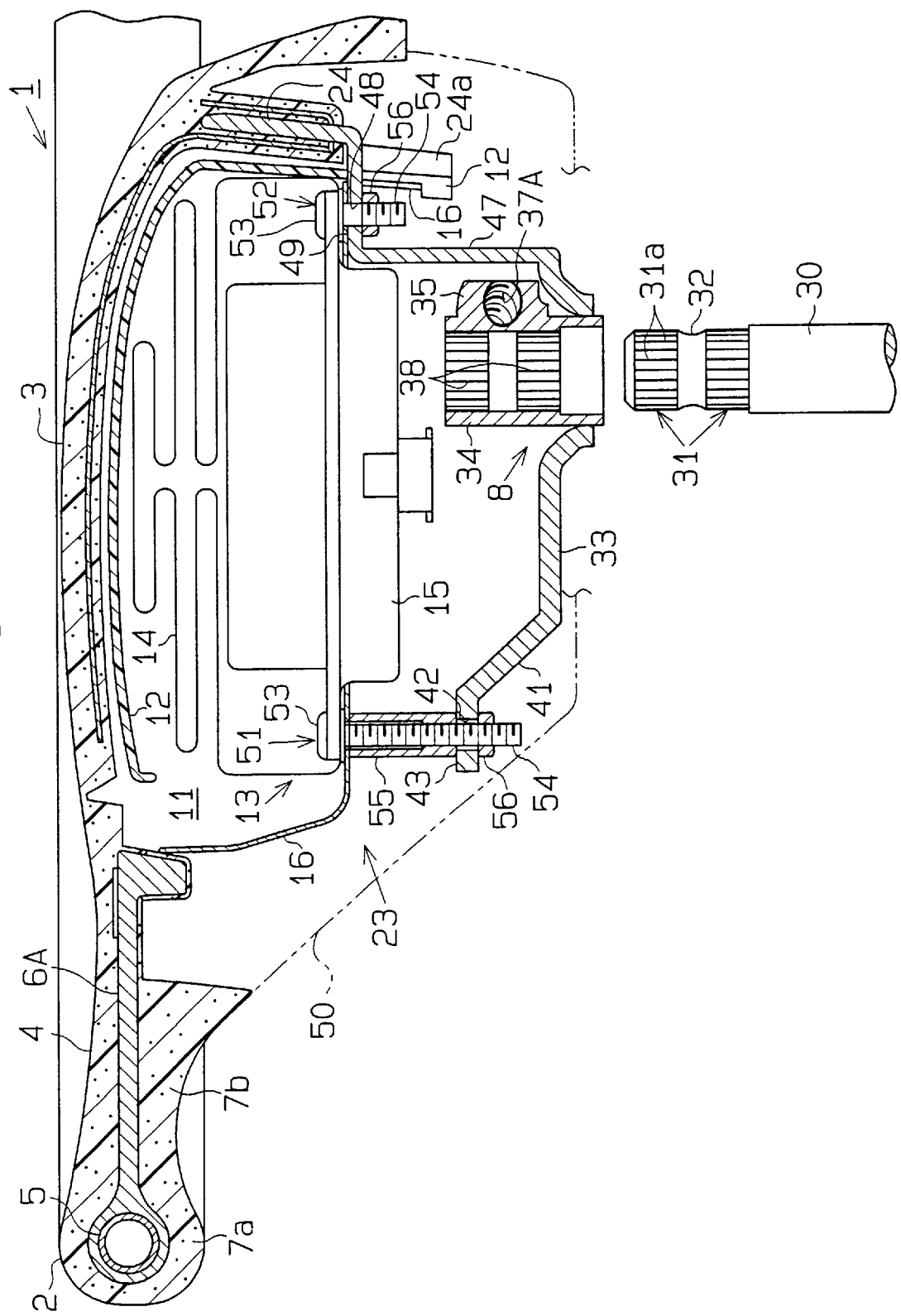
FIG. 6 is a partial cross-sectional view showing the steering wheel of FIG. 1 mounted on a steering shaft.

As shown in FIG. 6, the steering shaft 30 includes a splined portion 31 at the distal end. The splined portions 31 has a predetermined number of outer splines 31*a* (generally about thirty). An annular groove 32 is formed in the vertical center of the splined portion 31. As shown in FIGS. 2, 4 and 6, the boss 8 includes a boss plate 33 and a steel cylinder 34. The boss plate 33 has a hole in the center. The cylinder 34 is welded to the hole of the boss plate 33 and includes a clamp 35. The clamp 35 has a substantially C-shaped cross section having a pair of ends. A threaded hole 37A is formed in one end of the clamp 35, and a hole 37B is formed in the other.

The cylinder 34 further has splines 38, which correspond to splines 31 formed on the steering shaft 30. The cylinder 34 is attached to the distal end of the steering shaft 30 with the splines 31, 38 meshed with each other. A bolt 39 is then inserted in the hole 37B and screwed to the threaded hole 37A. The bolt 39 includes a threaded portion in its distal end and a flange 39*a* at the longitudinal center. Rotating the bolt 39 causes the clamp 35 to tightly hold the distal end of the steering shaft 30. This secures the steering wheel body 1 to the steering shaft 30 at the boss 8.

This embodiment has the following characteristic features. As shown in FIGS. 1 and 2, the boss plate 33 includes another arm 41 projecting toward the spoke core 6A. The arm 41 includes a leaf 43 at the distal end. A hole 42 is formed in the leaf 43. Also, the other arms 21 have a leaf 45, 46. The leaves 45, 46 includes a hole 44. The boss plate 33 is coupled to the bar 24 by another arm 47. The arm 47 also includes a leaf 49 having a hole 48.

The leaves 45, 46 of the arms 21 and the leaf 49 of the arm 47 are located in the same imaginary plane. The other leaf 43 is located below the plane of the leaves 45, 46 and 49 to make the opening 23 as large as possible.

The inflator 15, the air bag 14 and the bag holder 16 have bolt holes (four in this embodiment), respectively. Fasteners, or bolts 51, 52, are inserted in the holes. Each of the bolts 51, 52 includes a head 53 and a threaded portion 54. The heads 53 are welded to the inflator 15. When the air bag device 13 is assembled to the steering wheel body 1, the bag holder 16 is placed on the leaves 45, 46, 49, which are located on the same plane. The bolts 51, 52 are inserted in the holes 42, 44, 48 of the leaves 43, 45, 46, 49.

The bolt 51, which corresponds to the leaf 43 of the arm 41, is longer than the bolts 52, which correspond to the leaves 45, 46, 49. A collar 55 is screwed to the bolt 51. The length of the collar 55 is equal to the height difference between the leaf 43 and the other leaves 45, 46, 49. Therefore, the bag holder 16 is placed on the leaf 43 with the collar 55 in between while contacting the other leaves 45, 46, 49. The collar 55 may be welded to the bottom of the bag holder 16.

The threaded portions 54 of the bolts 51, 52 protrude from the bottom of the holes 42, 44, 48. Fasteners, or nuts 56 are screwed to the threaded portions 54.

The lower end of the switch plate 12 is engaged with a retainer (not shown) formed on the bag holder 16. The switch plate 12 is also supported by the bracket 24*a* of the bar 24. This stabilizes the positions of the bag holder 16 and the switch plate 12.

Assembly of the steering wheel W to the steering shaft 30 will now be described.

First, the membrane switch and the switch plate 12 are inserted in the steering wheel body 1 through the opening 23, which is defined by the boss 8, the connecting portions 21 and the connecting frames 22. Also, the air bag device 13 is inserted through the opening 23. Prior to insertion, the air bag device 13 is assembled. That is, the bolt holes of the air bag 14 are aligned with the bolt holes of the bag holder 16. Then, the inflator 15 is placed in the air bag 14 such that the bolts 51, 52, which are fixed to the inflator 15, are inserted in the aligned bolt holes of the air bag 14 and the bag holder 16. A projection is formed about each bolt hole of the bag holder 16. The projections are engaged with the threaded portions 54 of the bolts 51, 52. In other words, inserting the bolts 51, 52 in the bolt holes of the air bag 14 and the bag holder 16 secures the inflator 15 to the air bag 14 and the bag holder 16. The collar 55 is then screwed to the threaded portion 54 of the longer bolt 51.

The assembled air bag device 13 is inserted through the opening 23. Being relatively large, the opening 23 allows the air bag device 13 to be easily inserted in the steering wheel body 1.

The bag holder 16 is then placed on the leaves 45, 46, 49, which are located on the same plane, and the leaf 43 with the collar 55 in between. At this time, the bolts 51, 52 are inserted in the holes 42, 44, 48 of the leaves 43, 45, 46, 49 with the distal end of the threaded portions 54 protruding from the holes 42, 44, 48. The nuts 56 are screwed to the protruding threaded portions 54 of the bolts 51, 52.

The switch plate 12 is engaged with the retainer (not shown) of the bag holder 16 and supported by the bracket 24*a* of the support bar 24. In this manner, the air bag device 13 is installed in the steering wheel body 1.

The lower cover 50 is attached to the steering wheel body 1. Further, as shown in FIG. 6, the cylinder 34 of the boss 8, which is fixed to the steering wheel body 1, is fit to the distal end of the steering shaft 30. The splines 31 of the shaft 30 are engaged with the splines 38 of the cylinder 34.

The bolt 39 is inserted in the hole 37B of the clamp 35 and screwed to the threaded hole 37A. Screwing the bolt 39 causes the clamp 35 to hold the distal end of the steering shaft 30. This allows the splines 31 of the steering shaft 30 and the splines 38 on the cylinder 34 to firmly mesh with each other. A part of the bolt 39 is engaged with the groove 32 on the steering shaft 30. Meshing between the splines 31 and the splines 38 prevents the steering wheel body 1 from rotating in relation to the steering shaft 30. The engagement between the bolt 39 and the groove 32 prevents the steering wheel 1 from being displaced axially on the steering shaft 30. In this manner, the steering wheel body 1 is secured to the steering shaft 30 at the boss 8.

The above embodiment has the following advantages.

The bolts 51, 52, which are welded to the inflator 15, are inserted in the bolt holes of the air bag 14 and the bolt holes of the bag holder 16. This couples the air bag 14, the inflator 15 and the bag holder 16 to one another. The bolts 51, 52 are then inserted in the holes 42, 44, 48 of the leaves 43, 45, 46, 49 and the nuts 56 are screwed to the threaded portions 54 of the bolts 51, 52. This secures the air bag 14, the inflator 15 and the bag holder 16, which are integrated, to the steering wheel body 1. This construction reduces the number of bolts and nuts for securing the air bag device 13 to the steering wheel 1 compared to the prior art. In other words, this apparatus reduces the number of the parts in the steering wheel W. Accordingly, the number of manufacturing steps is reduced, and the manufacturing of the wheel W is facilitated.

The bolts 51, 52 and the nuts 56 are used as fasteners for securing the air bag device 13 to the steering wheel 1. Further, the heads of the bolts 51, 52 are previously welded to the inflator 15. This prevents the bolts 51, 52 from falling off when mounting the air bag device 13 to the the steering wheel body 1 thereby further facilitating the assembly.

The cylinder 34 of the boss 8 is fit to the distal end of the steering wheel 30 such that the splines 31, 38 of the shaft 30 and the cylinder 34 mesh with each other. The bolt 39 then fastens the clamp 35 to the shaft 30. Therefore, the steering wheel body 1 is easily secured to the steering shaft 30 through the boss 8 after securing the air bag device 13 to the steering wheel body 1.

Since the pad 3 is integrally formed with the surface layers 7a, 7b, the top of the steering wheel W cannot be opened. However, the bolt 39 is fastened from the side of the steering wheel W. The steering wheel W is therefore easily secured to the steering shaft 30 from the side.

The switch plate 12 is engaged with the retainer of the bag holder 16 and supported by the bracket 24a of the support bar 24. This ensures the stability of the switch plate 12 during inflation of the bag 14.

The leaf 42 of the arm 41 is located at a position lower than the other leaves 45, 46, 49. This enlarges the opening 23 thereby facilitating the insertion of the air bag device 13 into the space 11 through the opening 23. When the air bag device 13 is inserted into the steering wheel W, the collar 55 compensates for the height difference between the leaf 42 and the leaves 45, 46, 49. The height difference of the leaf 42 and the leaves 45, 46, 49 therefore does not hinder the mounting of the air bag device 13. Also, the collar 55 supports the air bag device 13 on the steering wheel body 1 in a stable manner.

Figure 7:
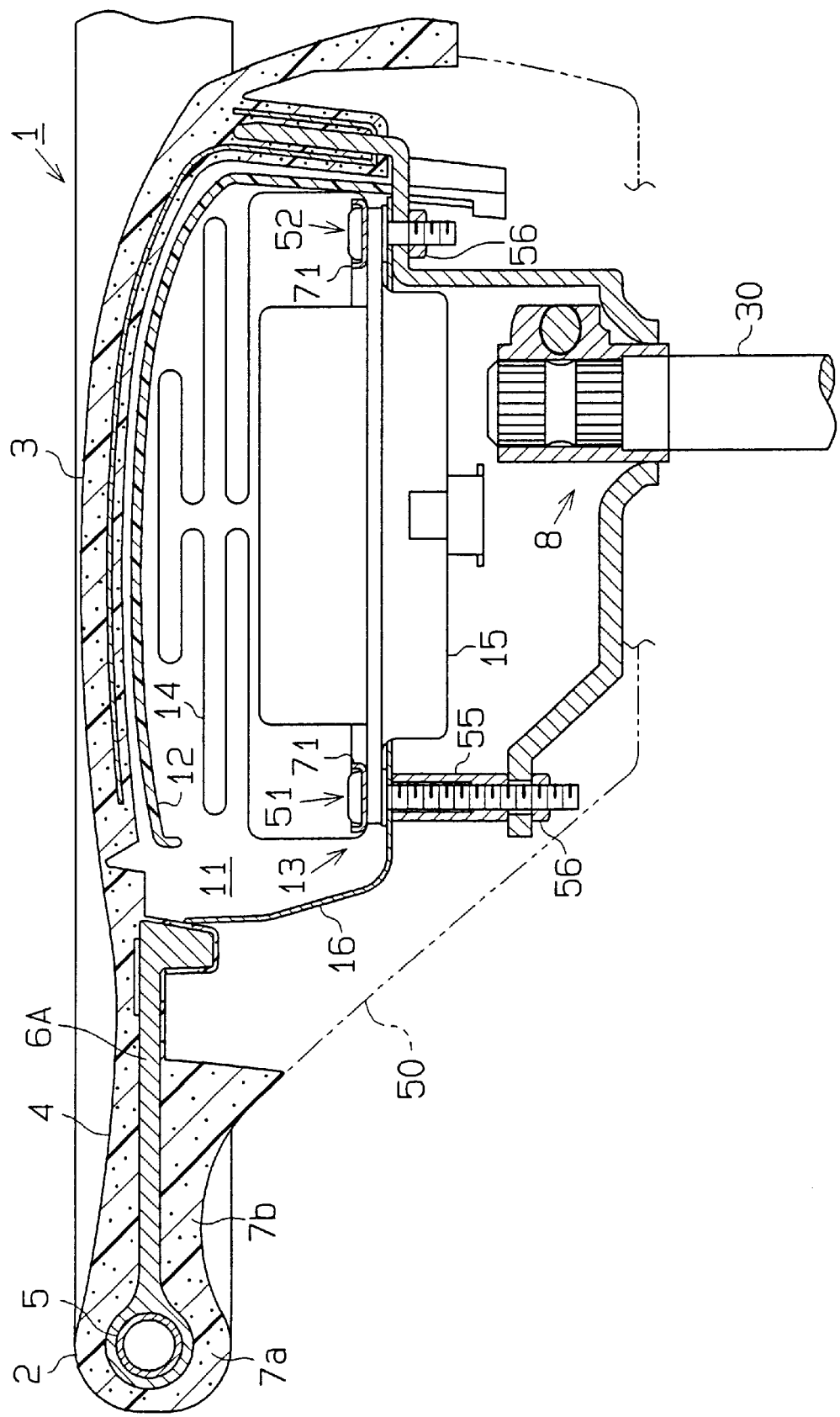
FIG. 7 is a partial cross-sectional view illustrating a steering wheel according to a second embodiment of the present invention.

A second embodiment of the present invention will now be described with reference to FIG. 7. The differences from the first embodiment will mainly be discussed below. In the first embodiment, the bolts 51, 52 are previously secured to the inflator 15. However, in this embodiment, an annular ring retainer 71 is located on the inflator 15 with the air bag 14 held between the retainer 1 and the inflaor 15. The bolts 51, 52 are inserted and welded to the retainer 71. The bolts 51, 52, which protrude from the retainer 71, are inserted in the bolt holes of the air bag 14, the bolt holes of the inflator 15 and the bolt holes of the bag holder 16. This secures the parts 71, 14, 15, 16 to one another. Other constructions are the same as those of the first embodiment. Therefore, the embodiment of FIG. 7 has the same advantages as the first embodiment.

A third embodiment of the present invention will now be described with reference to FIGS. 8 to 15. The differences from the first embodiment will mainly be discussed below, and like or the same reference numerals are given to those components that are like or the same as the corresponding components of the first embodiment.

Figure 8:
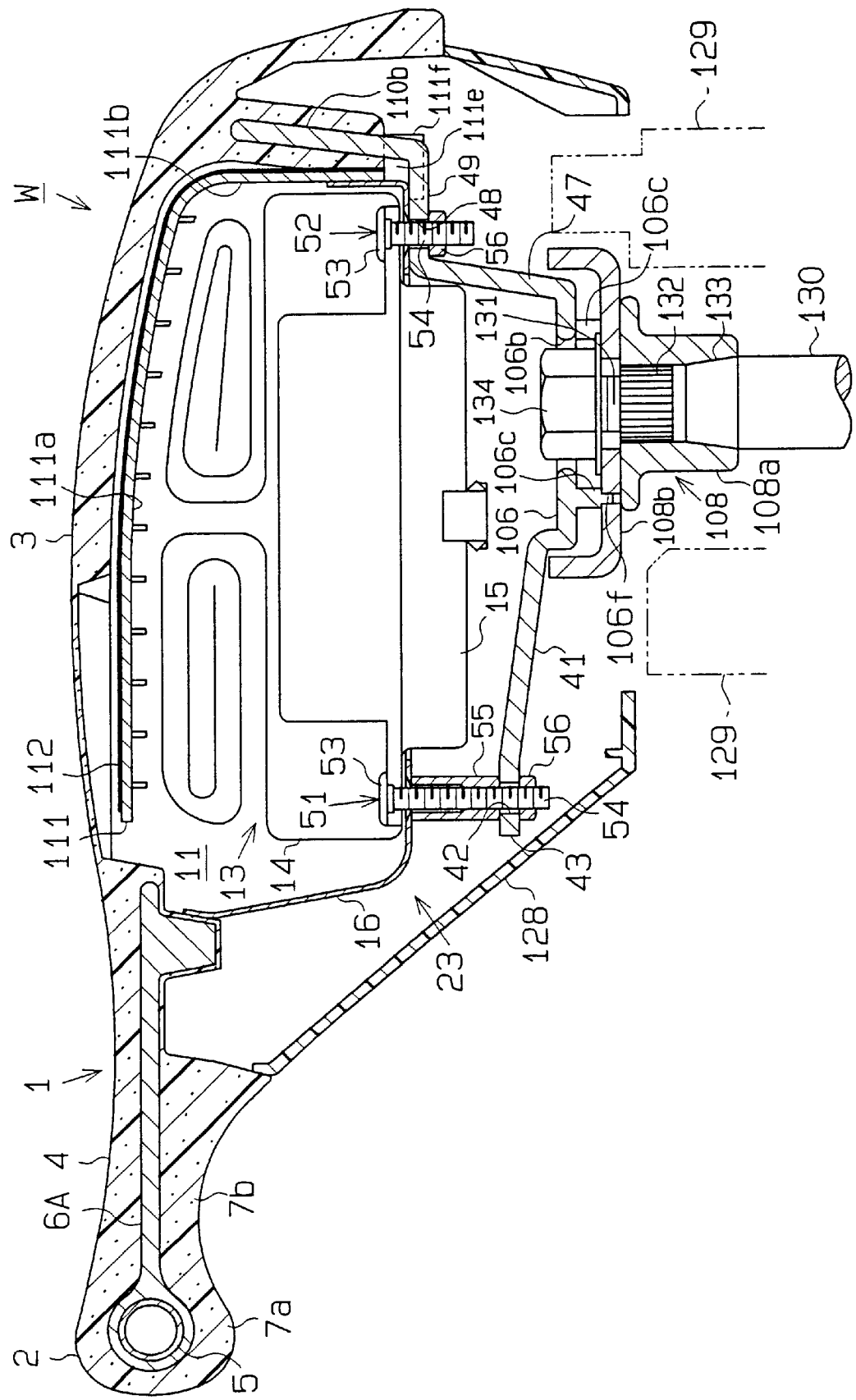
FIG. 8 is a partial cross-sectional view illustrating a steering wheel according to a third embodiment the present invention taken along line VIII—VIII of FIG. 10.
Figure 10:
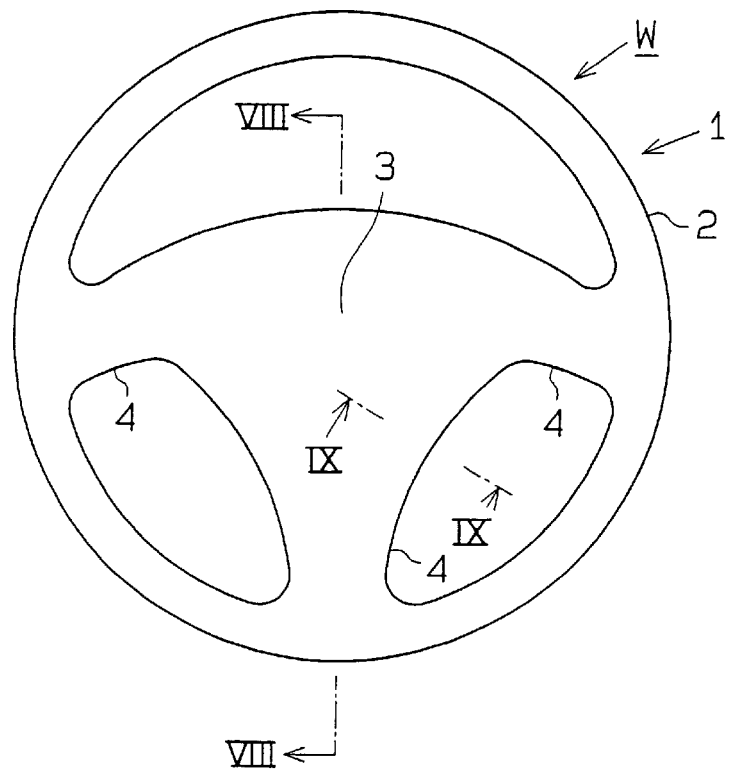
FIG. 10 is a front view of the steering wheel of FIG. 8.

As shown in FIG. 10, the body 1 of a steering wheel W has the same appearance as that of the first embodiment. That is, the body 1 includes a gripping ring 2, a pad 3 and three spokes 4. As shown in FIG. 8, the ring 2 includes a ring core 5 and a surface layer 7a, which covers the ring core 5. The spokes 4 include spoke cores 6A, 6B, 6C and a surface layer 7b, which covers the spoke cores 6A, 6B, 6C.

Figure 11:
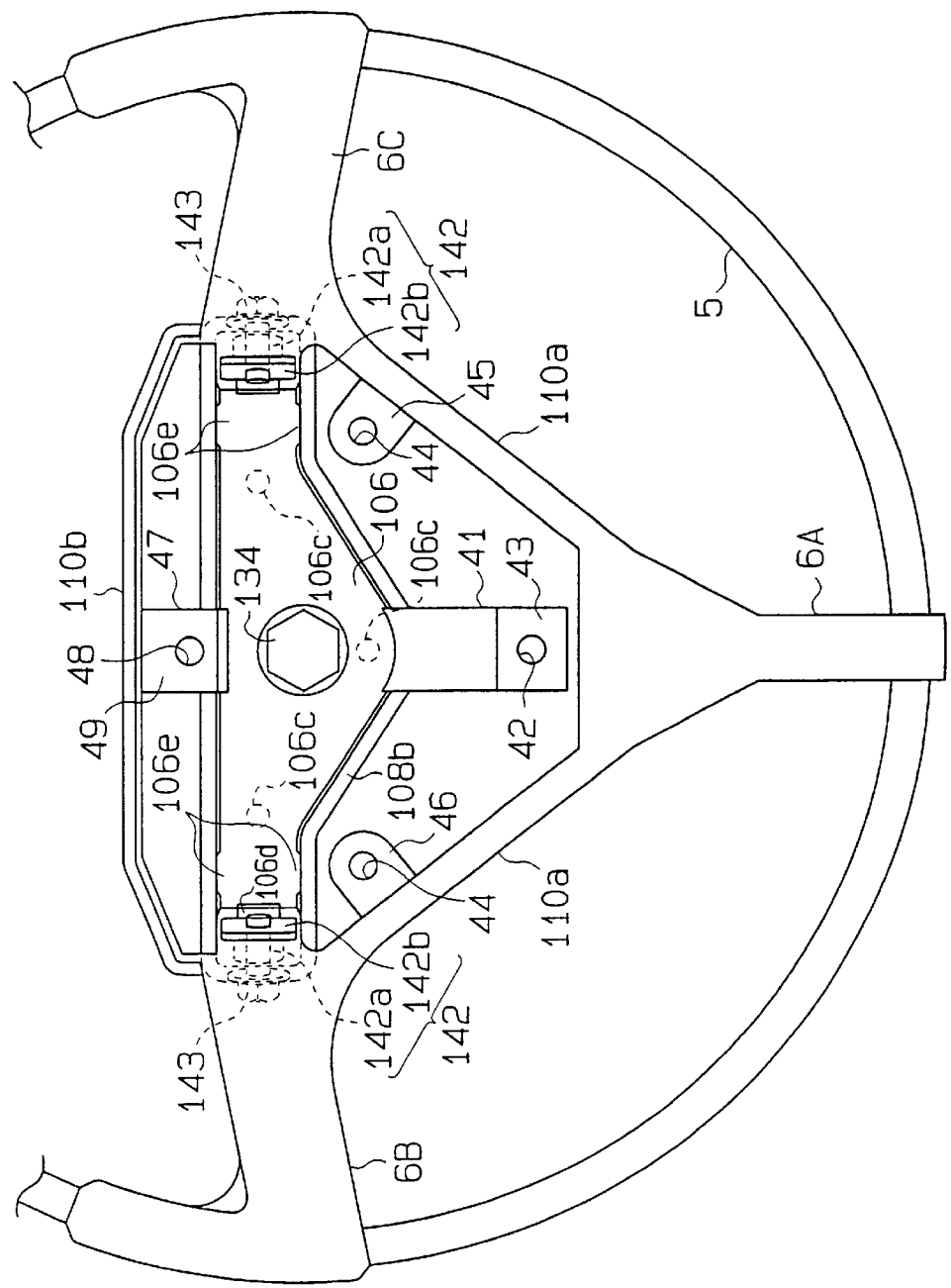
FIG. 11 is a partial front view of the steering wheel with the cover removed.
Figure 15:
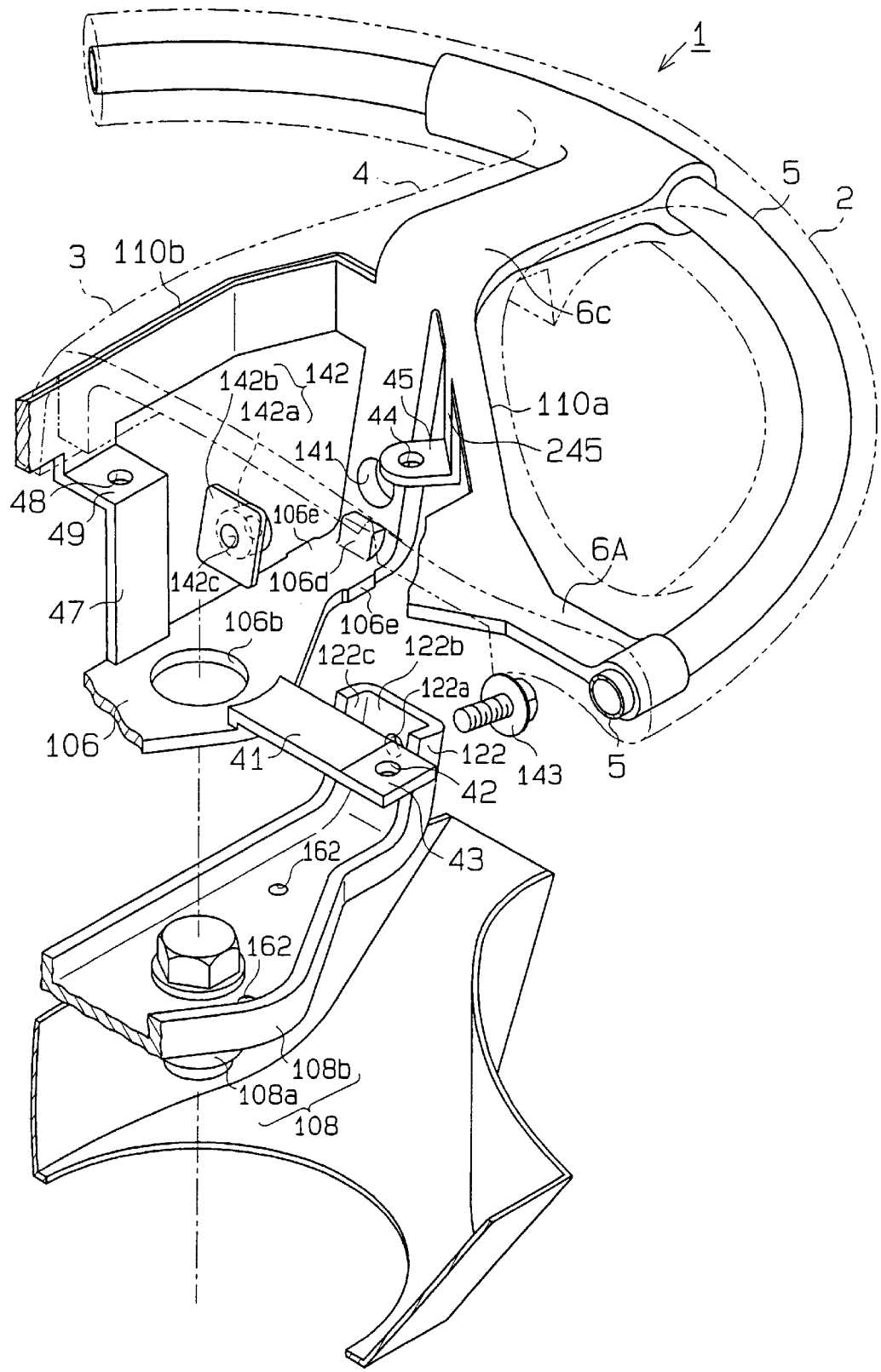
FIG. 15 is an exploded perspective view showing a steering wheel being installed to a boss plate.

As shown in FIGS. 8, 11, and 15, the spoke cores 6A, 6B, 6C extend between the ring core 5 and the center of the core 5. The spoke cores 6B and 6C are integrally coupled to each other by a connecting plate 106. The connecting plate 106 is integrally formed with the cores 6B and 6C and includes parts that extend downward from the spoke cores 6B, 6C and a part located below the pad 3. The plate 106 also has a hole 106b formed in the center. The spoke cores 6B, 6C are coupled to the other spoke core 6A (the driver's side) by frames 110a. The spoke cores 6B and 6C are integrally coupled to each other by a frame 110b. The connecting structure of the plate 106 and the frames 110a provides a relatively large opening 23 in front of the driver's seat.

A boss 108 is located below the plate 106 and is secured to the a steering shaft 108. The boss 108 includes a boss plate 108b, which is formed by pressing a steel plate, and a steel cylinder 108a, which is welded to a center hole of the plate 108b.

An accommodating space 11 is defined below the pad 3. The space 11 accommodates a switch plate 111, a membrane switch 112 and an air bag device 13. As in the first embodiment, the membrane switch 112 has a pair of thin plates that constitute part of a horn switch circuit (not shown). When the pad 3 is pressed, the thin plates contact each other and activates a horn. The switch plate 111 is made of a resin having a predetermined stiffness and covers the air bag device 13. The membrane switch 112 is fixed on the switch plate 111. As in the first embodiment, the air bag device 13 includes an air bag 13, an inflator 15 and a bag holder 16.

The assembly of the steering wheel W will now be described.

Figure 12:
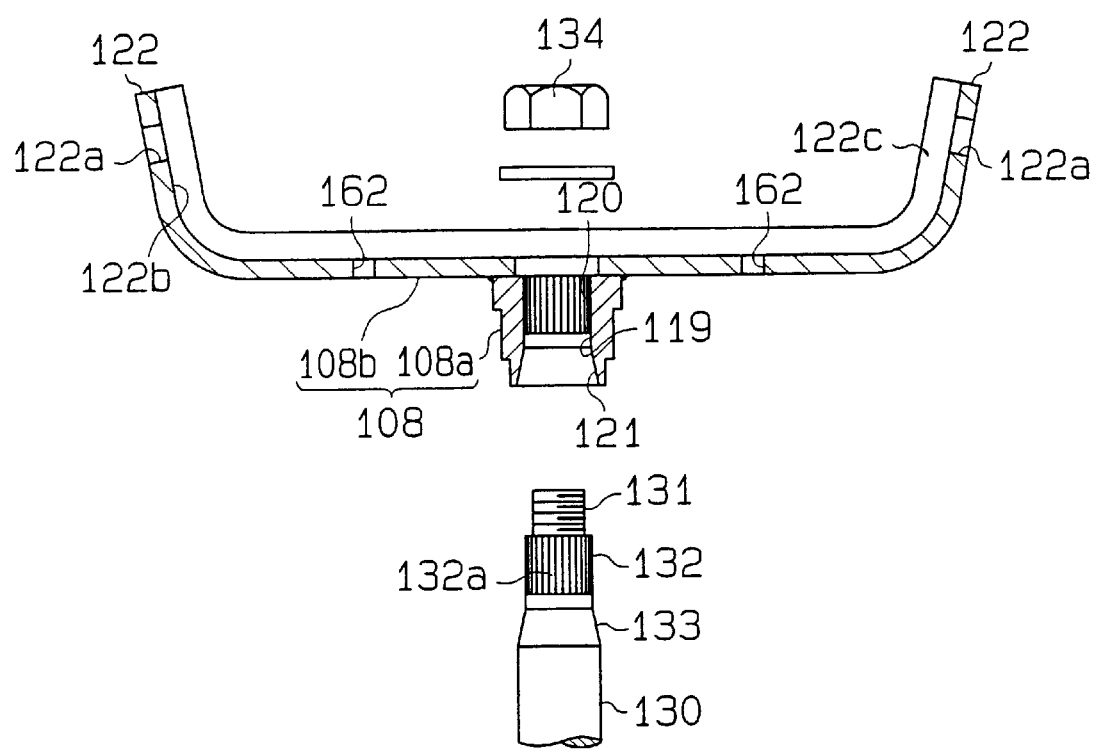
FIG. 12 is an exploded cross-sectional view showing the steering shaft and a boss plate of the steering wheel of FIG. 8.

First, the assembly of the boss 108 will be described. As shown in FIG. 12, the steering shaft 130 has a threaded portion 131 at the distal end. A splined portion 132 and a tapered surface 133 are defined below the threaded portion 131. A predetermined number of splines (generally about thirty) are provided in the splined portion 132. The cylinder 108a has a hole 119. A splined portion 120 and a tapered surface 121 are defined in the walls of the hole 119. The boss 108 is fit onto the distal end of the steering shaft 130. That is, the splined portion 120 is engaged with the splined portion 132 of the steering shaft 130 while the tapered surface 121 contacts tapered surface 133 of the shaft 130. A nut 134 is then screwed to the threaded portion 131 for fixing attaching the boss 8 to the shaft 130.

The boss plate 108b has a shape corresponding to the shape of the plate 106 for supporting the plate 106. Specifically, a pair of supports 122 extend upward from both sides of the plate 108b. A through hole 122a having a diameter slightly larger than that of a bolt 143 (described later) is defined in each support 122.

As shown in FIG. 15, through holes 141 (only one is shown) are defined in the plate 106. When the plate 106 is placed on the boss plate 108b, the axis of each hole 141 coincides with the axis of the hole 122a of the associated support 122. Projections 106d (only one is shown) project from the inner wall of the plate 106 at the bent portions, which are located lower than the holes 141.

As shown in FIGS. 11 and 15, a collar 142, which is made of an iron-based metal, is inserted in each hole 141. The collar 142 includes a cylinder 142a and a square flange 142b. The axial length of the cylinder 142a is substantially equal to the axial length of each hole 141. The flange 142b is formed integrally with the cylinder 142a. A threaded portion 142c is defined in the collar 142. When the cylinder 142a is fit into one of the holes 141 from the inner side of the plate 106, the lower end of the flange 142b abuts against the associated projection 106d. In this state, the bolt 143, which has an integrally formed washer, is screwed to the threaded portion 142c of the collar 142.

The plate 106 also has three studs 106c projecting from the bottom surface. The studs 106c define a triangle, the center of which coincides with the hole 106b provided at the center of the plate 106. A projection 106f projects from the bottom surface of each stud 106c (see FIG. 8). The diameter of the projections 106f is smaller than that of the studs 106c. The boss plate 108b has three bores 162, each project corresponds to one of the projections 106f. Four protrusions 106e extend laterally from the plate 106. The protrusions 106e are located near the sides of the plate 106.

As shown in FIGS. 8 and 15, the lower side of the steering wheel body 1 is covered by a lower cover 128. The lower cover 128 is made of thermoplastic resin and has holes (not shown) through which the bolts 143a and a tool for fastening the bolts 143 are inserted in the cover 128. A spiral cable 129, which is used for supplying electric power to the air bag device 13 and the other parts, is located about the steering shaft 130.

Figure 9:
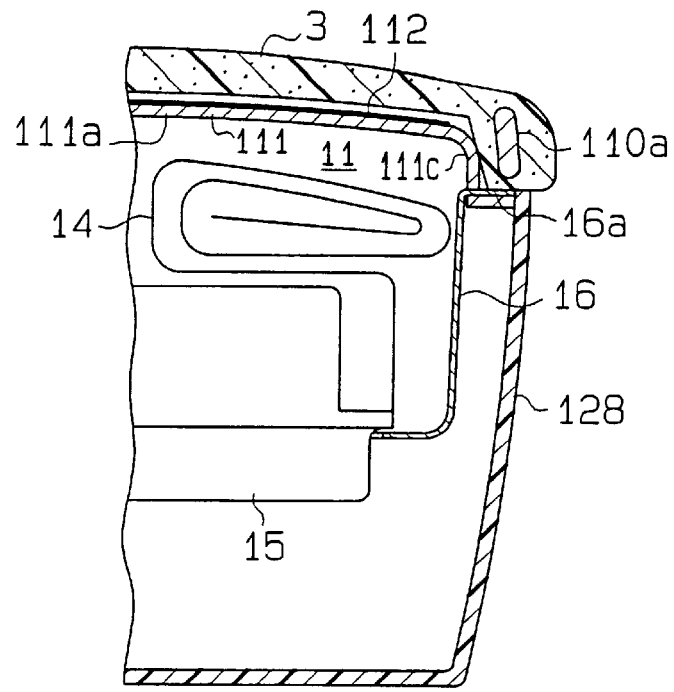
FIG. 9 is a partial cross-sectional view taken along line IX—IX of FIG. 10.
Figure 13:
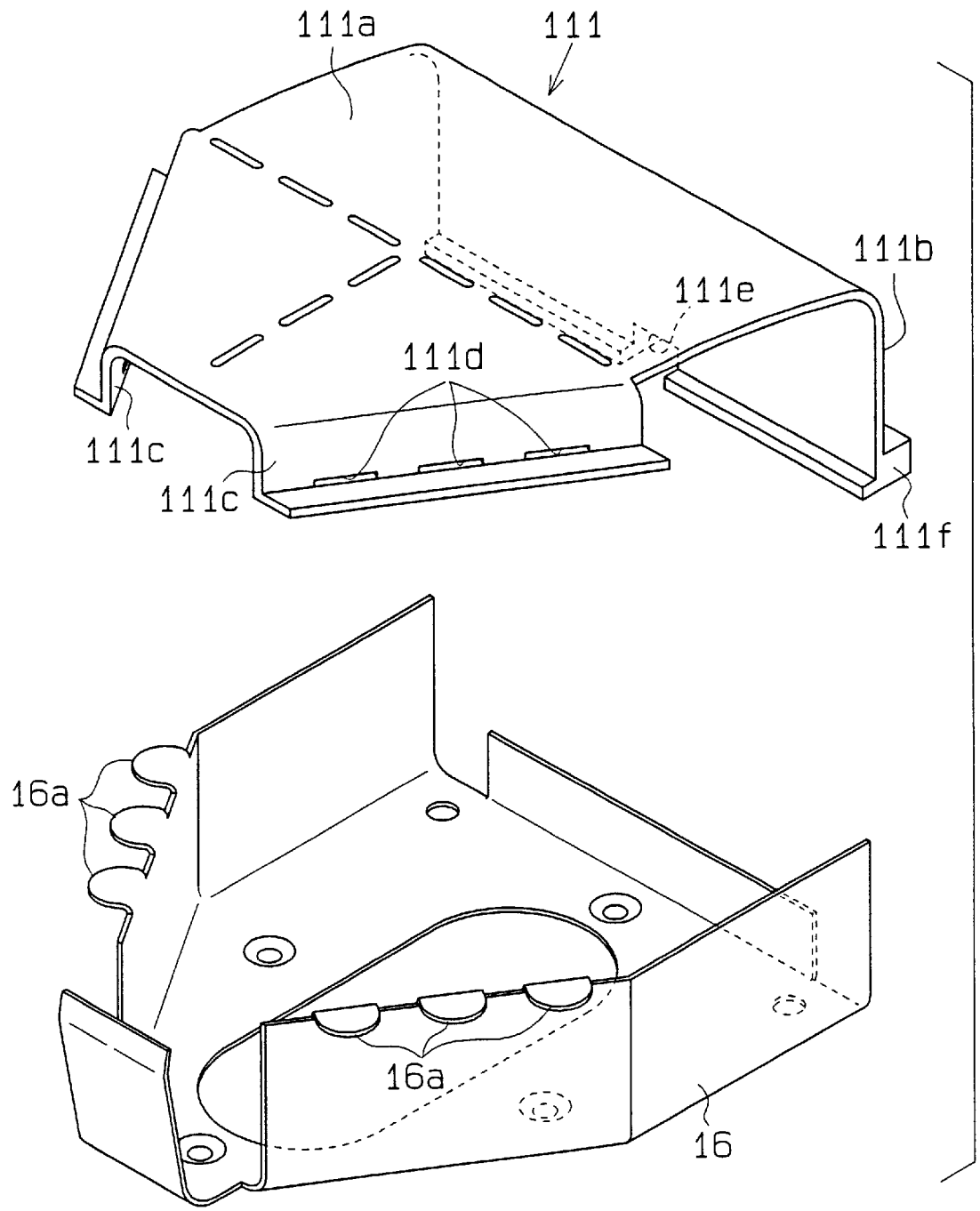
FIG. 13 is an exploded perspective view showing a switch plate and a bag holder.

As shown in FIG. 13, the switch plate 111 includes a plate 111a and legs 111b, 111c, which extend downward from the sides of the plate 111a. As shown in FIGS. 8 and 9, the legs 111b are located between the frames 110a and the leg 111c is located between the frame 110b and the bag holder 16. As shown in FIG. 13, the leg 111b has a foot 111f at the lower end. The foot 111f is thicker than the other part of the leg 111b.

As shown in FIGS. 9 and 13, the lower end of each legs 111c is fixed outwardly. Slits 111d are formed in the flexed portion. The bag holder 16 has tabs 16a, each of corresponds to one slit 111d. Engaging the tabs 16a with the slits 111d prevents the switch plate 111 from being displaced with respect to the bag holder 16.

The embodiment has the following characteristic features. As shown in FIGS. 8, 11 and 15, the plate 106 includes an arm 41 projection toward the spoke core 6A. The arm 41 includes a leaf 43 at the distal end. A hole 42 is formed in the leaf 43. The frames 110a have arms 245, 246 projecting downward. The arms 245, 246 have leaves 45, 46. Each of the leaves 45, 46 has a hole 44. The frame 110a is coupled to the plate 106 by an arm 47. The arm 47 also includes a leaf 49 that has a hole 48. The leg 111b of the switch plate 111 has a notch 111e at the center of the foot 111f (see FIG. 13). The notch 111a corresponds to the arm 47. The notch 111e prevents the switch plate 111 from interfering with the arm 47.

The structure of the leaves 43, 45, 46, 49 is the same as that in the first embodiment. That is, the leaves 45, 46 of the arms 245, 246 and the leaf 49 of the arm 47 are located on the same imaginary plane. The other leaf 43 is located below the plane of the leaves 43, 45, 46, 49 for making the opening 23 as large as possible.

The inflator 15, the air bag 14 and the bag holder 16 have bolt holes (four in this embodiment), respectively. Bolts 51, 52, are inserted in the bolt holes. Each of the bolts 51, 52 includes a head 53, which are welded to the inflator 15. As in the first embodiment, inserting the bolts 51, 52 to the bolt holes of the air bag 14 and the bolt holes of the bag holder 16 secures the air bag 14, the inflator 15 and the bag holder 16 to one another.

Further, this embodiment of the invention is similar to the first embodiment in that the bolt 51 corresponding to the leaf 43 is longer than the bolts 52 corresponding to the leaves 45, 46, 49, and in that the cylindrical collar 55 is screwed to the longer bolt 51.

Assembly of the steering wheel W to the steering shaft 130 will now be described.

First, the boss 108 is fit to the distal end of the steering shaft 130 as shown in FIG. 12. The splined portion 132 of the steering shaft 130 is meshed with the splined portion 120 of the boss 108. The nut 134 is screwed to the threaded portion 131 to fasten the boss 108 to the shaft 130. The boss 108 is then covered by the lower cover 128.

Figure 14:
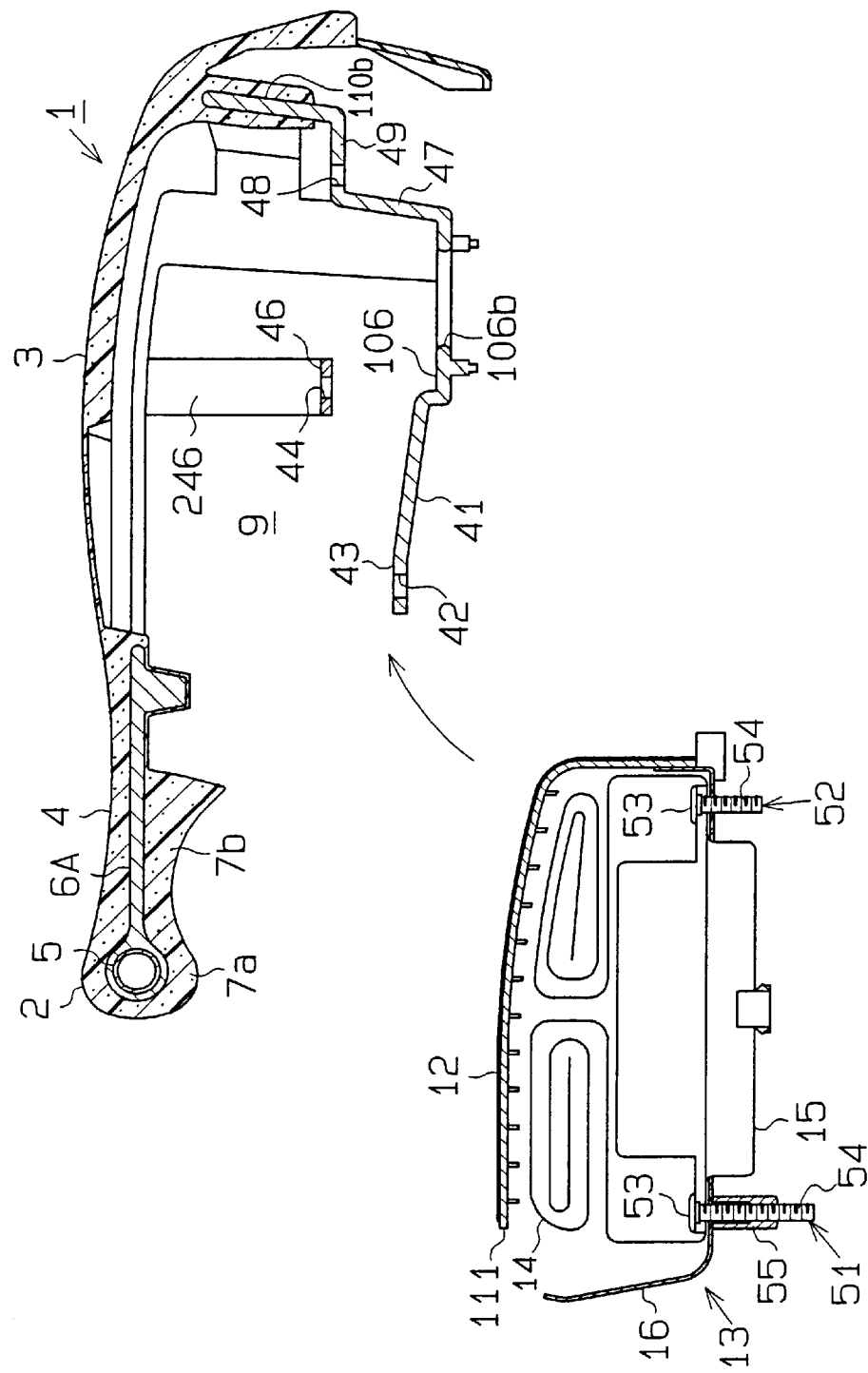
FIG. 14 is a partial cross-sectional view showing an air bag device being installed.

The steering wheel 1 is assembled separately from the boss 108 and the shaft 130. As shown in FIG. 14, the air bag 14, the inflator 15 and the bag holder 16 are assembled to form the air bag device 13 as in the first embodiment. The collar 55 is attached to the longer bolt 51. Subsequently, the switch plate 111 is attached to the bag holder 16 by engaging the tabs 16a of the bag holder 16 with the slits 111d of the plate 111. The membrane switch 112 is placed on and fixed to the switch plate 111.

The air bag device 13, the switch plate 111 and the membrane switch 112, which are assembled, are inserted in the space 11 through the opening 23. Part of the bag holder 16 is directly placed on the leaves 45, 46, 49, which are located on the same plane. Another part of the bag holder 16 is placed on the other leaf 43 with the collar 55 in between. The bolts 51, 52 are inserted in the holes 42, 44, 48 of the leaves 43, 45, 46, 49. The nuts 56 are screwed to the threaded portions 54 of the bolts 51, 52.

As shown in FIGS. 8 and 9, the legs 111b, 111c of the switch plate 111 are located between the frames 110a, 110b and the bag holder 16.

The steering wheel body 1 then placed on the boss 108. Specifically, as shown in FIGS. 11 and 15 (the air bag device 13 is not illustrated in the FIGS. 11 and 15), the plate 106 of the steering wheel body 1 is placed on the boss plate 108b. The collars 142 are previously fit to the holes 141. The steering wheel 1 is guided to a predetermined position on the boss plate 108b by the lower cover 128. This facilitates the positioning of the steering wheel body 1 in relation to the boss 108.

Placing the connecting plate 106 on the boss plate 108b causes the three studs 106c on the bottom of the connecting plate 106 to engage the boss plate 108b. Further, the projections 106f on the studs 106c are fit in the bores 162 of the boss plate 108b (see FIG. 8). The protrusions 106e of the plate 106 contact the ribs of the boss plate 108. This construction improves the positioning accuracy of the plate 106 in relation to the boss 108.

The bolts 143 are inserted in the holes 122a of the supports 122 and screwed to the threaded portions 142c of the collars 142. The flanges 142b of the collar 142 abut the projections 106d on the plate 106. This prevents the collars 142 from being rotated with the bolts 143 thereby ensuring the fastening of the bolts 143. The bolts 143 fasten the plate 106 to the boss 108 thereby pressing the studs 106c against the boss 108. This prevents the plate 106 from being held loosely in the boss 108. The sides of each flange 142b contact inner walls 122c of the support's ribs. Also, the sides of the plate 106 contact the rib walls 122*c* of the support 122 and the outer surface of the plate 106 contacts the inner wall 122*b* of the support 122. Therefore, the plate 106 is securely held in the boss 108. In this manner, the steering wheel body 1 is secured to the steering shaft 130 by the boss 108.

The third embodiment has the same advantages as the first embodiment.

When the bad pad 3 is pressed for activating the horn, the pressing force acts on the membrane switch 112 and the switch plate 111. The legs 111*b*, 111*c* of the switch plate 111 are held between the connecting frames 110*a*, 110*b* and the bag holder 16. The switch plate 111 therefore is not displaced by the pressing force. That is, the pressing force effectively acts on the membrane switch 112. Thus, when designing the steering wheel W, the magnitude of force required for activating the horn is easily calculated by only considering a force component that acts on the pad 3 and the membrane switch 112. This facilitates the operation for activating the horn.

U.S. Pat. No. 5,369,232 describes a steering wheel having a pad and a resin switch plate. The pad has an engaging portion protruding downward and the switch plate has an engaging hole. The engaging portion is engaged with the hole for securing the switch plate to the back of the pad. A membrane switch is located between the switch plate and the pad. Since the switch plate is attached to the pad, pressing the pad for activating a horn deforms the switch plate as well as the membrane switch. It is therefore, difficult to calculate the force required to activate the horn. As a result, activation of the horn becomes difficult. This embodiment solves such a problem.

The steering wheel body 1 includes the frames 110*a*, 110*b* and the air bag device 13 includes the bag holder 16. The frames 110*a*, 110*b* and the bag holder 16 hold the legs 111*b*, 111*c* of the switch plate 111. This construction eliminates the need for extra parts for holding the switch plate 111, thereby lowering the manufacturing cost and facilitating assembly of the steering wheel W.

The foot 111*f* of the leg 111*b* is engaged with the bag holder 16 and the frame 110*b*. Thus, the switch plate 111 is not displaced upward both with respect to the bag holder 16 during inflation of the air bag 14. This ensures stability of the switch plate 111 during inflation of the bag 14.

The tabs 16*a* of the bag holder 16 are engaged with the slits 111*d* of the switch plate 111. This further restricts the movement of the switch plate 111 in relation to the bag holder 16. Engagement of the tabs 16*a* with the slits 111*d* loosely fastens the switch plate 111 to the bag holder 16. In this state, the air bag device 13 is easily installed in the steering wheel body 1. The structure of the slits 111*d* and the tabs 16*a* is simple and easy to manufacture.

Although several embodiments of the present invention have been described herein, it should be apparent to those skilled in the art that the present invention may be embodied in many other specific forms without departing from the spirit or scope of the invention. Particularly, it should be understood that the present invention may also be embodied in the forms described below.

In the first to third embodiments, the bolts 51, 52 and the nuts 56 are used as fasteners. However, rivets, clips and the like may be used as fasteners.

In the first to third embodiments, the leaves 43, 45, 46, 49 are used for securing the air bag device 13 to the steering wheel body 1. The positions of the leaves 43, 45, 46, 49 are not limited to the positions illustrated in FIGS. 2 and 15. For example, the leaves may be formed on the spoke cores 6A, 6B, 6C. The number of the leaves is also not limited to four.

In the third embodiment, the slits 111*d* are formed in the switch plate 111 and the tabs 16*a* are formed on the bag holder 16. However, the tabs may be formed on the switch plate 111 and the slits may be formed in the bag holder 16. The slits and the tabs may be replaced with other engaging structures. Further, the engaging structure of the tabs and the slits may be omitted.

In the first and second embodiments, the clamp type boss 8 is used. However, as in the third embodiment, the boss may be fitted to a steering shaft having a threaded portion at the distal end. In this case, a nut is screwed to the distal end of the shaft. Further, the clamp type boss may used in the third embodiment.

In the first to third embodiments, the steering wheel W has three spokes 4. However, the present invention may be embodied in steering wheels having two spokes or in steering wheels having four or more spokes.

In the first to third embodiments, the spoke cores are made of aluminum alloy. Other light metals, such as magnesium, may be used in lieu of aluminum alloys. Tron-based metals are used as the material for various members (the collar 42 and others) in the present invention. Such metals include hot rolled mild steel sheet (as classified in Japanese Industrial Standard (JIS) G3131), cold rolled steel sheet (as classified in JIS G3141), and electrolytic zinc-coated carbon steel sheet (as classified in JIS G3313).

In the first to third embodiments, adjacent pairs of the spokes are connected by connecting frames. However, only part of the adjacent pairs of the spokes may be connected by the connecting frames.

Therefore, the present examples and embodiments are to be considered as illustrative and not restrictive and the invention is not to be limited to the details given herein, but may be modified within the scope and equivalence of the appended claims.

What is claimed is:

1. A steering wheel mounted on a steering shaft, the steering wheel comprising:

a ring member serving as a hand grip;

a boss member secured to the steering shaft;

a spoke member for connecting the boss member to the ring member;

a pad located above the boss member, wherein an accommodating space is defined between the boss member and the pad, wherein the accommodating space has an opening that opens to a side of the steering wheel;

an air bag device accommodated in the accommodating space, wherein the opening in the accommodating space allows the air bag device to be inserted in the accommodating space, wherein the air bag device includes an air bag, an inflator for supplying gas to the air bag to inflate the air bag, and a bag holder for holding the air bag and the inflator;

a support member located on at least one of the boss member and the spoke member to support the air bag device, wherein the support member includes a first support member located at a position corresponding to the opening in the accommodating space and a second support member, wherein the first support member disposed than the second support member in order to enlarge the opening; and a plurality of fasteners for integrally joining the air bag, the inflator, and the bag holder to each other, wherein the fasteners secure the integrally joined air bag, inflator and bag holder to the steering wheel through the first and second support members.

2. The steering wheel according to claim 1, wherein each fastener includes a bolt, which has a head and a threaded portion, and a nut screwed to the threaded portion of the bolt, and wherein each of the first and second support members has a bolt hole through which the bolt in inserted.

3. The steering wheel according to claim 2, wherein the head of each bolt is attached to the inflator.

4. The steering wheel according to claim 3, wherein the air bag and the bag holder each have bolt holes through which bolts are inserted, and wherein the air bag, the inflator and the bag holder are coupled to each other with the bolts.

5. The steering wheel according to claim 2, wherein the air bag device further includes a ring retainer for holding the air bag on the inflator, wherein the head of each bolt is attached to the ring retainer, wherein the air bag, the inflator and the bag holder each have bolt holes through which bolt are inserted, and wherein the ring retainer, the air bag, the inflator and the bag holder are coupled to each other with the bolts.

6. The steering wheel according to claim 2 further comprising a collar having a length equal to a height difference between the first support member and the second support member, wherein the collar is fit to the bolt corresponding to the first support member, and wherein the air bag device is directly placed on the second support member and is supported by the first support member through the collar.

7. The steering wheel according to claim 1 further comprising:

at least one additional spoke member for connecting the boss member to the ring member;

a connecting member for connecting the spoke members to each other;

a switch plate located between the pad and the air bag device, wherein the switch plate includes a flat plate and a log plate extending away from the flat plate, and wherein the leg plate is held between the connecting member and the air bag device to prevent the switch plate from being displaced; and a membrane switch fixed on the switch plate, wherein the membrane switch activates a horn when a pressing force applied to the pad acts on the membrane switch.

8. The steering wheel according to claim 7, wherein the leg plate is held between the bag holder of the air bag device and the connecting member.

9. The steering wheel according to claim 8, wherein the leg plate has a foot engaged with at least one of the bag holder and the connecting member.

10. The steering wheel according to claim 9 further comprising an engaging structure located between the bag holder and the switch plate to prevent the switch plate from being displaced with respect to the bag holder.

11. The steering wheel according to claim 10, wherein the engaging structure includes a slit formed in the switch plate and a projection formed on the bag holder to engage with the slit.

* * * * *